United States Patent [19]

Haberland

[11] Patent Number: 5,047,124
[45] Date of Patent: Sep. 10, 1991

[54] APPARATUS FOR FEEDING GAS INTO A SALINE SOLUTION

[75] Inventor: Karlheinz Haberland, Bruchsal, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 385,107

[22] Filed: Jul. 26, 1989

[30] Foreign Application Priority Data

Jul. 29, 1988 [DE] Fed. Rep. of Germany ....... 3825856

[51] Int. Cl.$^5$ .......................... B01D 1/00; B01D 3/42
[52] U.S. Cl. ...................... 202/181; 73/302; 73/439; 159/16.1; 159/901; 202/193; 202/202; 202/203; 203/1; 203/49; 203/DIG. 8; 203/DIG. 25
[58] Field of Search ............... 202/160, 201, 203, 181, 202/202, 193; 203/49, DIG. 17, DIG. 8, 1-3, DIG. 25; 159/16.1, 24.2, DIG. 12, DIG. 32, 901; 73/302, 439

[56] References Cited

U.S. PATENT DOCUMENTS 3,262,313 7/1966 Hanna .................................. 73/302
4,269,664 5/1981 Younger .............................. 202/197
4,444,623 4/1984 Youngner ............................... 203/1
4,762,593 8/1988 Youngner ............................... 203/1

FOREIGN PATENT DOCUMENTS 2827428 1/1980 Fed. Rep. of Germany .
3131407 7/1982 Fed. Rep. of Germany .

OTHER PUBLICATIONS

"Engineering for Nuclear Fuel Reprocessing", Justin T. Long, p. 735, American Nuclear Society, 1978.
"Chemie der Nuklearen Entsorgung", Part II, F. Baumgärtner, pp. 203 to 213, Thiemig-Taschenbücher, vol. 66, Verlag Karl Thiemig, Munich, 1978.

Primary Examiner—Virginia Manoharan
Attorney, Agent, or Firm—Walter Ottesen

[57] ABSTRACT

An apparatus for feeding gas into a heated saline solution for pressure measurement or to pump this solution. The gas is introduced into the solution through a gas bubbling-in pipe having a gas outlet opening. The gas is heated prior to being introduced into the solution and is charged with moisture until the saturation of the gas comes close to or corresponds to the saturation conditions in the solution at the gas outlet opening. This minimizes clogging by crystallization at the feeder pipes carrying the measuring or purge gas.

3 Claims, 2 Drawing Sheets

5,047,124

APPARATUS FOR FEEDING GAS INTO A SALINE SOLUTION

FIELD OF THE INVENTION

The invention relates to a method of feeding gas into a heated saline solution for measuring pressure or to pump this solution. An apparatus for carrying out the method is also disclosed.

BACKGROUND OF THE INVENTION

Measurement of the concentration and level of filling of vessels which hold saline solutions can be carried out by what is referred to as the so-called bubbling-in method. The measuring gas is introduced into the liquid through air-bubbling pipes. The density or filling level can be ascertained by the pressure differential as disclosed in the text "Chemie der Nuklearen Entsorgung", Part II, Thiemig-Taschenb0cher, Vol. 66, pages 203 to 213 (1978) and published by Verlag Karl Thiemig, Munich.

If this pressure differential method is used for saline liquids or for liquids which tend to crystallize out, for example, in an evaporator, then the measuring air extracts moisture from the solution so that crystallization can occur in the supply pipe, that is, in the region of the air outlet opening of the bubbling-in pipe. In this unfavorable situation, the pressure differential increases with increasing operating time and simulates operating conditions which deviate from the actual. It is possible for the measuring line to finally become completely blocked. In addition to the incorrectly measured value, frequent maintenance is regarded as a disadvantage.

Saline solutions can also be propelled by air-lift means as disclosed on page 210 of the above-mentioned text "Chemie der Nuklearen Entsorgung". Here, too, there is the risk of clogging.

The problem of clogging has been countered by using larger pipe diameters for the pressure measuring means. However, they provide inaccurate results as noted in the text "Engineering for Nuclear Fuel Reprocessing", by Justin T. Long, page 735, American Nuclear Society 1978.

SUMMARY OF THE INVENTION

It is an object of the invention to provide a method of the type described above wherein clogging because of crystallization in the measuring or purge gas feed pipes is minimized.

According to a feature of the method of the invention, the gas is heated and charged with moisture before being introduced into the solution through the gas bubbling-in pipe so that the gas is saturated such that the extent of saturation comes close to or corresponds to the saturation conditions in the gas at the gas outlet opening of the gas bubbling-in pipe.

Crystallization is prevented if the measuring or purge gas is humidified to saturation as far as possible prior to being introduced. The conditions of temperature and pressure at the gas outlet opening of the gas feed pipe are adopted as a basis when providing measures needed to achieve saturation.

The measuring or purge gas cannot draw any further moisture from the saline solution inside the bubbling-in pipe or directly at the gas outlet opening. Thus, the risk of clogging is reduced.

When the method according to the invention is practiced in an evaporation plant, the measuring or purge gas is humidified by using the residual heat in the evaporator distillate. The distillate supplied heats and saturates the measuring or purge gas. Practicing the method of the invention in this way constitutes a considerable saving of energy.

It is also an object of the invention to provide an apparatus for measuring pressure in a natural circulation evaporator when carrying out the method of the invention. In this apparatus, the evaporator distillate is fed into the air bubbling-in pipe outside the measuring housing and humidifies the measuring air while flowing through in the direction of the air outlet opening.

The measuring housing is connected to the vapor chamber for receiving the vapor evaporated from the saline solution and the liquid level of the liquid in the measuring housing partitions the latter into two zones. The two zones formed in this way lie in the unfilled and filled regions of the measuring housing. The first heating zone heats the supplied distillate, since the venting to the vapor chamber of the evaporator vessel causes the temperature prevailing there to also be present above the surface of the liquid in the measuring housing. In the second zone, the temperature is in the region of the boiling temperature so that the distillate evaporates and saturates the measuring air according to the conditions at the outlet of the bubbling-in pipe.

BRIEF DESCRIPTION OF THE DRAWINGS

The invention will now be explained with reference to the drawings wherein.

DESCRIPTION OF THE PREFERRED EMBODIMENTS OF THE INVENTION

Figure 1:
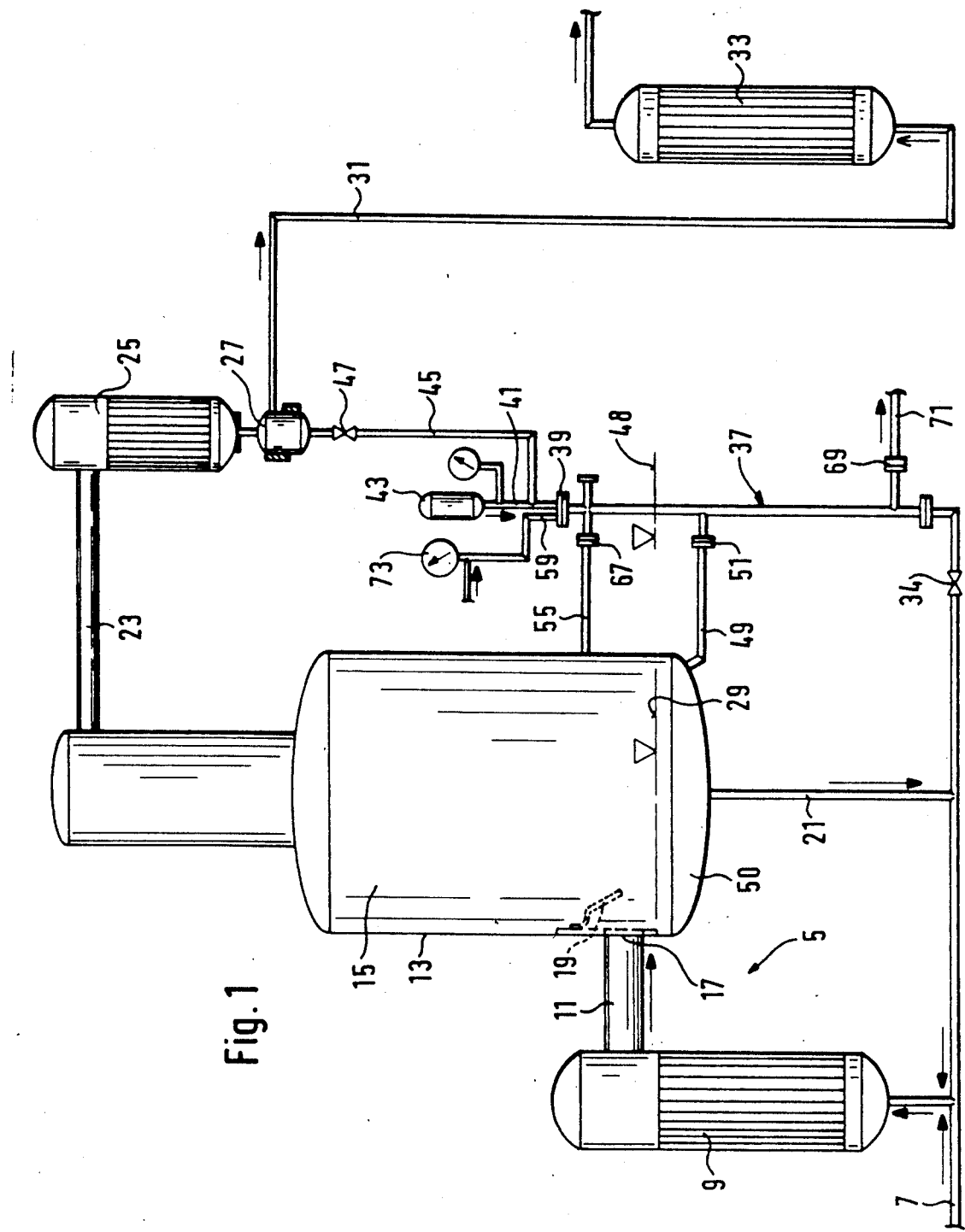
FIG. 1 shows a flow diagram of the method in the context of a natural circulation evaporator; and, FIG. 2 is an enlarged view of the measuring housing for measuring the filling level shown in the flow diagram of FIG. 1.

The arrangement shown includes a natural circulation evaporator system 5 into which an aqueous solution of uranium is fed and concentrated by evaporation. A pipe 11 extends through the upper part of the evaporator 9 and from there leads to a vessel 13 which comprises a large vapor chamber 15. The feed opening 17 is masked by a cap 19. The vessel 13 is connected at its base to the feed line 7 via a pipe 21 to form the natural circulation.

The vapor leaving at the upper end of chamber 15 is conducted through a pipe 23 to a condenser 25. The distillate is drawn off at the bottom of the condenser 25 and passed to a supply vessel 27 mounted at a distance above the level of liquid (sump) 29 in the vessel 13. From the supply vessel 27, a pipe 31 leads to a condensate after-cooler 33 from which the distillate obtained is returned to the process.

Figure 2:
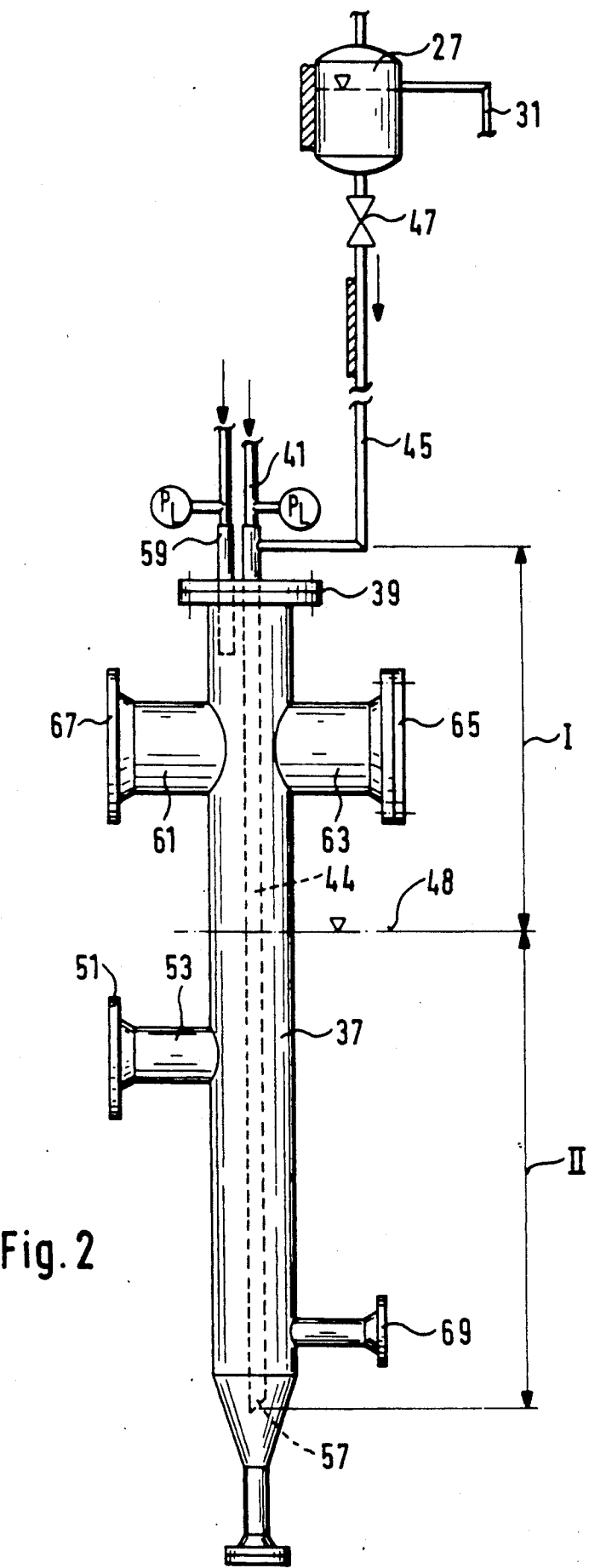

The feed line 7 is connected to the bottom of a measuring housing 37 mounted parallel to the vessel 13 with a shut-off valve 34 disposed between the housing 37 and the feed line 7. At its upper end, the elongated measuring housing 37 is connected via a flange connection 39 to a pipe 41 which leads to an air vessel 43 and then extends downwardly through the measuring housing 37 to function as an air bubbling-in pipe 44 (see FIG. 2). The pipe 41 is connected to the supply vessel 27 for the distillate via a pipe 45 which includes shut-off valve 47.

The measuring housing 37 represents a quieting zone which makes it possible to accurately measure the level of the filling. Turbulences occur in the region of the evaporator and the vapor chamber which are disadvantageous to making a measurement.

The measuring housing 37 (FIG. 2) has the same liquid level 48 as is present in the vessel 13 pecause it is connected to the sump 50 of the latter via a pipe 49. The pipe 49 ends at a flange connection 51 at a housing stub 53 on the side of the measuring housing. The liquid passes out of the vessel 13 and into the measuring housing 37 through the pipe 49. The measuring housing 37 is vented to the vapor chamber 15 of the vessel 13 via pipe 55 arranged above the pipe 49.

Bubbling air is fed into the measuring housing 37 via the pipe 41 which feeds into pipe 44 having the outlet opening 57 in the lower region of the measuring housing. A parallel air pipe 59 ends in the upper portion of the measuring housing 37 and is provided to detect the pressure in the measuring chamber above the surface of the liquid.

In its upper region, the measuring housing 37 has two laterally disposed diametrically opposite housing stubs (61, 63). One of these housing stubs 63 is closed off by a blind flange 65. The other housing stub 61 is connected via a flanged connection 67 to the pipe 55 which terminates in the vapor chamber 15 of the vessel 13.

A housing stub 69 is mounted at the side of and in the lower portion of the measuring housing 37. A discharge pipe 71 for concentrate is connected to the housing stub 69.

The air bubbling-in pipe 44 terminates in a beveled air outlet opening 57 below the stub 69.

The further air line 59 passes through the upper flanged connection 39 of the measuring housing 37 and terminates with an open end in the upper portion of the measuring housing 37. This air line 59 too is connected to a pressure measuring system which operates pursuant to the differential pressure measuring method.

The operation of the above-described apparatus for carrying out the method of the invention will now be described.

The uranium evaporator system 5 includes an evaporator 9 and a vessel 13 and operates in a natural cycle at normal pressure (approximately 1 bar absolute). The nitric acid aqueous uranium solution is introduced with an initial concentration of approximately 80 g/l uranium and is concentrated down to approximately 400 g/l uranium.

In the measuring housing 37 arranged parallel to the vessel 13 and evaporator 9, the fill level and density of the concentrated circulating uranyl nitrate solution (sump product) is measured by the air-bubbling method. These measured values are used for regulating the evaporator and the product outflow. The vapor is condensed in the condenser 25 and the distillate is subjected to secondary cooling in the heat exchanger 33 on the downstream end.

The measuring air is brought in at 25° C. This measuring air should be saturated with water before entering into the concentrated solution. The evaporator distillate is used as a humidifying liquid. It is drawn off upstream of the condensate after-cooler 33 so that it still has some residual heat and no auxiliary heating arrangement is needed. The distillate is fed into the pipe 41 above the measuring housing 37 and into the bubbling-in pipe 44 for the measurement of the filling level.

The distillate can flow out freely because the distillate supply vessel 27 is disposed above the measuring housing 37 with the latter being approximately 5 meters long. Venting takes place via the evaporator vapor chamber 15 in which the temperature is 95° C. The bubbling-in pipe 44 extends down about 3 meters into the concentrate solution which is heated to 105° C. so that heating of the air and saturation can occur in two zones as described hereinafter.

The distillate supplied and the measuring air are further heated in the heat-up zone I since this space above the liquid surface 48 in the measuring housing 37 is connected to the vapor chamber 15 in which the temperature is approximately 95° C. In the next zone II, the bubbling-in pipe 44 lies in the liquid, the temperature of which is close to the boiling temperature because the measuring housing 37 is connected to the sump 50 of the vessel 17 and has sump product flowing through it. The distillate evaporates so that the measuring air is saturated to correspond to the conditions in the region of the outlet opening 57. For this reason, the measuring air can no longer extract any humidity from the concentrate inside the bubbling-in pipe 44 or directly at the air outlet opening 57. The risk of clogging by crystallization is reduced.

It is understood that the foregoing description is that of the preferred embodiments of the invention and that various changes and modifications may be made thereto without departing from the spirit and scope of the invention as defined in the appended claims.

What is claimed is:

1. Apparatus for feeding gas in a natural circulation distillation assembly wherein a circulating concentrated saline solution having a predetermined heat content and a distillate are formed, the apparatus comprising:
   an enclosure defining an interior;
   a gas supply means;
   a bubbling-in gas pipe disposed in said enclosure and being connected to said gas supply means for receiving gas therein;
   a distillate supply vessel for receiving the distillate from the distillation assembly;
   said bubbling-in gas pipe being further connected to said distillate supply vessel for receiving a flow of distillate therein;
   conduit means interconnecting said enclosure and said distillation assembly for passing a portion of the concentrated saline solution into said interior of said enclosure thereby transferring the heat of said portion to the gas and distillate in said gas pipe and causing the gas in the gas pipe to become saturated with said distillate; and,
   said bubbling-in gas pipe having an opening and being mounted in said enclosure so as to extend down into said portion of said concentrated saline solution for bubbling the saturated gas through said opening and into said portion whereby a formation of crystals at said opening is prevented because of the saturated condition of the gas.

2. The apparatus of claim 1, wherein said gas in air and said bubbling-in gas pipe is a bubbling-in air pipe.

3. Apparatus for feeding gas in a natural circulation distillation assembly wherein a circulating concentrated saline solution having a predetermined heat content and a distillate are formed, the distillation assembly including a vessel defining a vapor chamber for receiving the vapor evaporated from the saline solution supplied to the distillation assemlby, the apparatus comprising:
   an enclosure defining an interior and communicating with the distillation assembly for receiving a portion of the concentrated saline solution;

an air supply means;

a bubbling-in air pipe connected to said air supply means for receiving air therein;

a distillate supply vessel for receiving the distillate from the distillation assembly;

said bubbling-in air pipe being also connected to said distillate supply vessel for receiving a flow of distillate therein so as to permit moisture to be transferred from the distillate to the air travelling in said air pipe;

said bubbling-in air pipe being mounted in said measuring housing so as to extend down into said portion of said concentrated saline solution for bubbling air into said portion and for transferring heat from said portion to the air and the distillate flowing in the air pipe; and, means for connecting said enclosure to the vapor chamber so as to cause a liquid level of said portion of the concentrated saline solution in said enclosure to define a first region of said interior above said level wherein the air and distillate flowing in said pipe are heated by the vapor from said vapor chamber and to define a second region of said interior below said level wherein the air and distillate flowing in said pipe are further heated by said portion of said concentrated saline solution.

* * * * *

UNITED STATES PATENT AND TRADEMARK OFFICE
CERTIFICATE OF CORRECTION

PATENT NO. : 5,047,124

DATED : September 10, 1991

INVENTOR(S) : Karlheinz Haberland

It is certified that error appears in the above-identified patent and that said Letters Patent is hereby corrected as shown below:

In column 1, line 19: delete "TaschenbOcher" and substitute -- Taschenbücher -- therefor.

In column 3, line 5: delete "pecause" and substitute -- because -- therefor.

In column 4, line 57: delete "in" and substitute -- is -- therefor.

In column 4, line 65: delete "assemlby" and substitute -- assembly -- therefor.

Signed and Sealed this

Ninth Day of February, 1993

Attest:

STEPHEN G. KUNIN

Attesting Officer

Acting Commissioner of Patents and Trademarks